United States Patent [19]

Murakami et al.

[11] Patent Number: 5,390,034
[45] Date of Patent: Feb. 14, 1995

[54] COLOR IMAGE PROCESSING METHOD AND APPARATUS WITH CHROMINANCE EMPHASIZING PROCESS

[75] Inventors: Tatsuya Murakami, Tachikawa; Eiichi Hadano, Hachioji; Kazuyuki Kodama, Tokyo; Kazunori Kinoshita; Masaaki Fujinawa, both of Odawara; Hiromichi Fujisawa, Tokorozawa, all of Japan

[73] Assignee: Hitachi, Ltd., Tokyo, Japan

[21] Appl. No.: 6,771

[22] Filed: Jan. 21, 1993

Related U.S. Application Data

[63] Continuation-in-part of Ser. No. 782,096, Oct. 24, 1991, Pat. No. 5,268,771, which is a continuation-in-part of Ser. No. 761,770, Aug. 15, 1991, Pat. No. 5,231,482, which is a continuation-in-part of Ser. No. 479,615, Feb. 13, 1990, Pat. No. 5,128,748.

[30] Foreign Application Priority Data

Jan. 23, 1992 [JP] Japan .................. 4-010369

[51] Int. Cl.⁶ .................. H04N 1/46; G03F 3/08
[52] U.S. Cl. .................. 358/518; 358/520; 348/661

[58] Field of Search .................. 358/520, 518, 523; 348/631, 661

[56] References Cited

U.S. PATENT DOCUMENTS 4,733,295 3/1988 Hemsky et al. .................. 358/520

Primary Examiner—Scott A. Rogers
Attorney, Agent, or Firm—Antonelli, Terry, Stout & Kraus

[57] ABSTRACT

Color image processing method and apparatus for suppressing side effects of a chrominance emphasizing process are provided. A chrominance C of an original color image is detected by a chrominance detector. A luminousness V of the original color image is detected by a luminousness detector. A parameter selector selects chrominance conversion parameters on the basis of the chrominance C and luminousness V to generate a selected parameter. A chrominance converter executes the chrominance conversion by chrominance conversion parameters a to i. It is possible to suppress a side effect such that the color deviation becomes conspicuous in a portion of small chrominance and luminousness due to the execution of the chrominance emphasizing process. Thus, image data of a high quality can be obtained.

10 Claims, 7 Drawing Sheets

| INPUT VALUE | | OUTPUT VALUE | | | | | | | | |
|---|---|---|---|---|---|---|---|---|---|---|
| CHROMINANCE C | LUMINOUSNESS V | a | b | c | d | e | f | g | h | i |
| $c \leq \beta$ | $v \leq \gamma$ | 0 | 1 | 0 | 0 | 1 | 0 | 0 | 1 | 0 |
| $c \leq \beta$ | $v > \gamma$ | 1 | 0 | 0 | 0 | 1 | 0 | 0 | 0 | 1 |
| $\beta < c \leq \alpha$ | — | 1 | 0 | 0 | 0 | 1 | 0 | 0 | 0 | 1 |
| $\alpha < c$ | — | $K_1$ | $K_2$ | $K_3$ | $K_4$ | $K_5$ | $K_6$ | $K_7$ | $K_8$ | $K_9$ |

F I G. 3
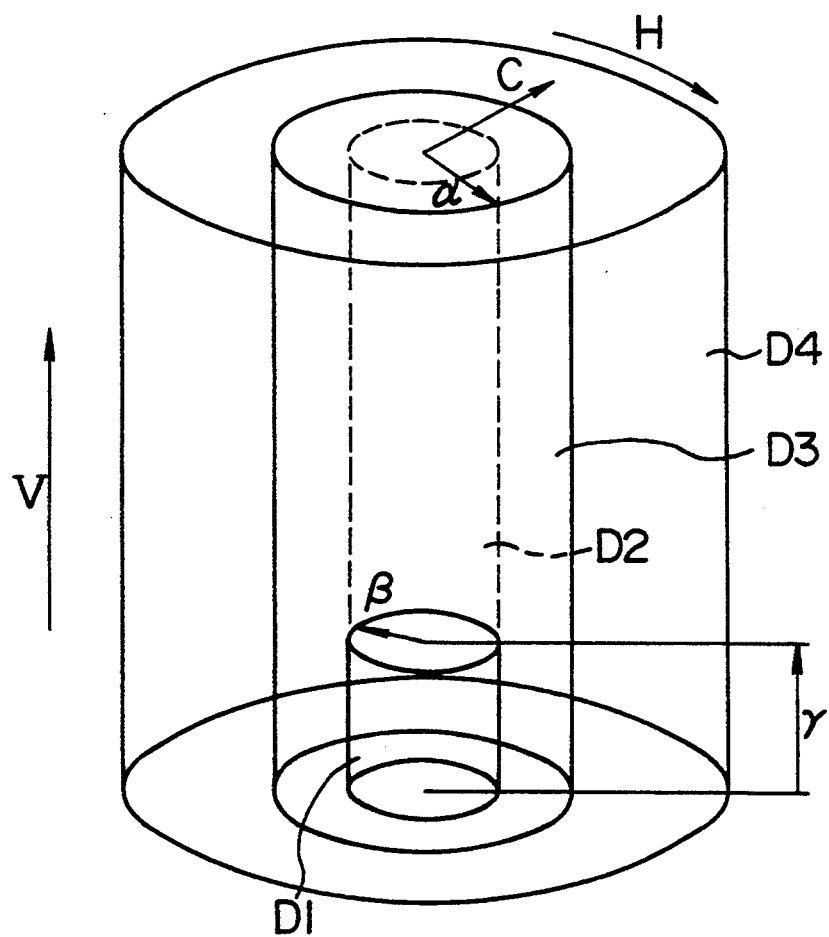

F I G. 4
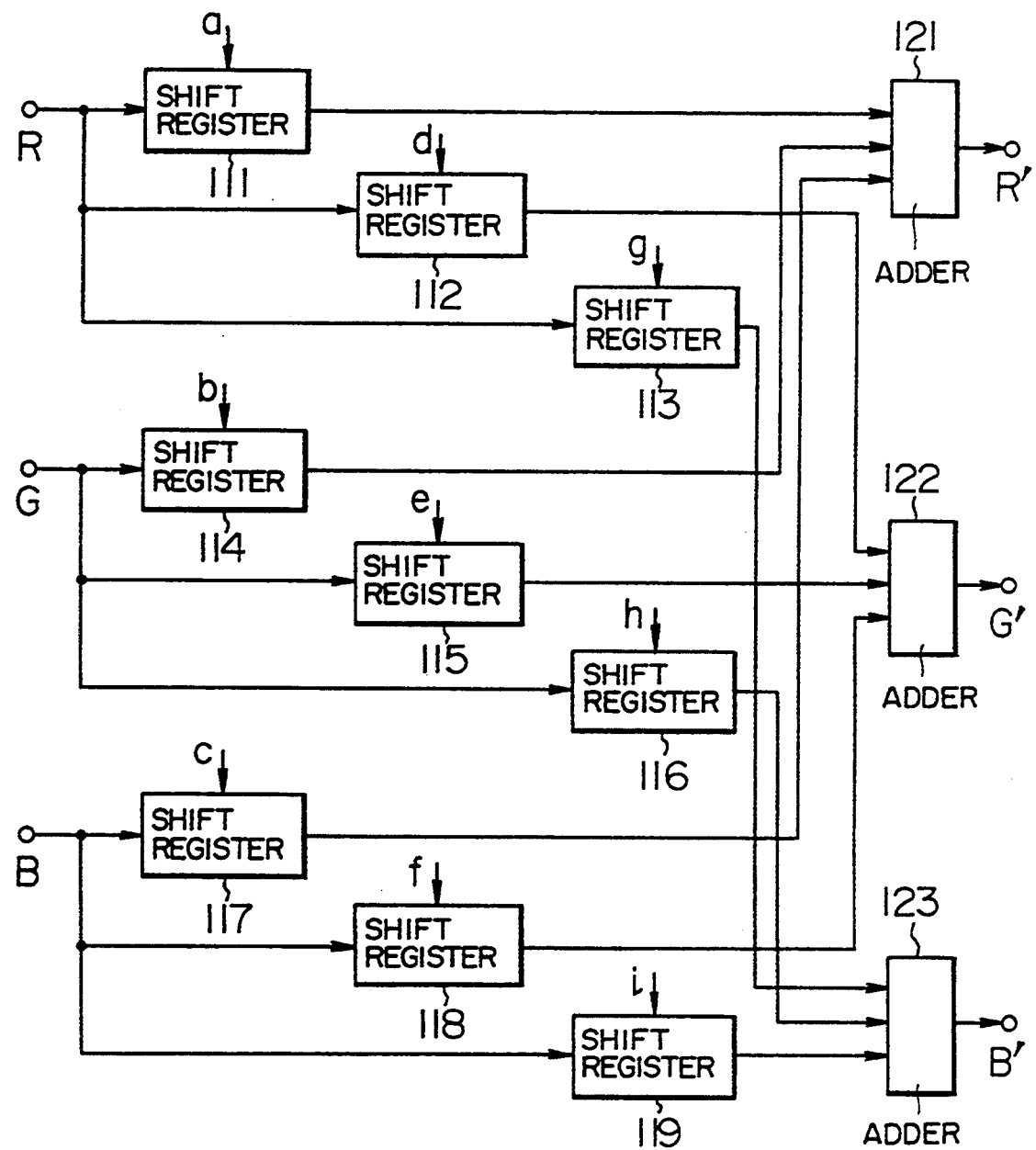

F I G. 5
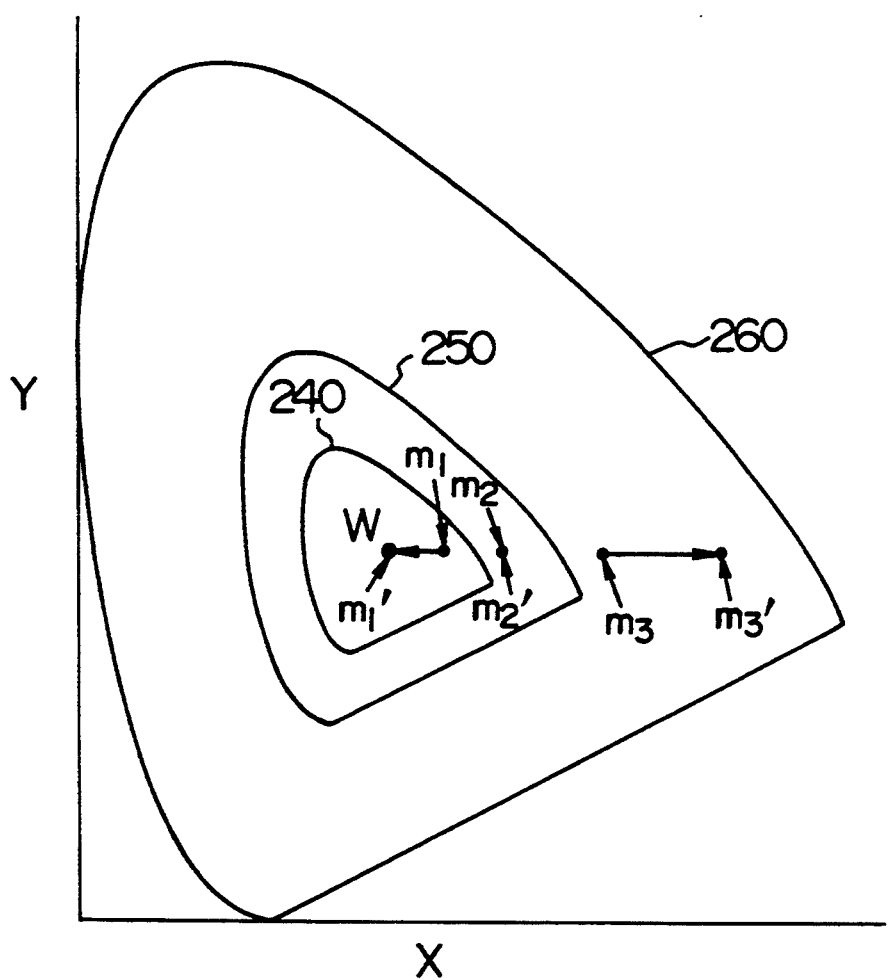

| INPUT VALUE | | | OUTPUT VALUE | | | | | | | | |
|---|---|---|---|---|---|---|---|---|---|---|---|
| FLG_V | FLG_C2 | FLG_C1 | a | b | c | d | e | f | g | h | i |
| 1 | 1 | — | 0 | 1 | 0 | 0 | 1 | 0 | 0 | 1 | 0 |
| 0 | 1 | 1 | 1 | 0 | 0 | 0 | 1 | 0 | 0 | 0 | 1 |
| — | 0 | 1 | 1 | 0 | 0 | 0 | 1 | 0 | 0 | 0 | 1 |
| — | 0 | 0 | $K_1$ | $K_2$ | $K_3$ | $K_4$ | $K_5$ | $K_6$ | $K_7$ | $K_8$ | $K_9$ |

COLOR IMAGE PROCESSING METHOD AND APPARATUS WITH CHROMINANCE EMPHASIZING PROCESS

CROSS-REFERENCE TO RELATED APPLICATIONS

This application is a continuation-in-part application of U.S. Ser. No. 07/782,096, filed on Oct. 24, 1991, now U.S. Pat. No. 5,268,771, which is a continuation-in-part application of U.S. Ser. No. 07/761,770, filed on Aug. 15, 1991, now U.S. Pat. No. 5,231,482, which is a continuation-in-part application of U.S. Ser. No. 07/479,615, filed on Feb. 13, 1990, now U.S. Pat. No. 5,128,748. The contents and disclosures of these applications are incorporated herein by reference.

BACKGROUND OF THE INVENTION

The present invention relates to color image processing method and apparatus and, more particularly, to color image processing method and apparatus which can suppress any side effects of the chrominance emphasizing process.

Hitherto, for instance, in Hiroshi Tanaka, "The Image Processing Application Technique," The Kogyo Chosakai, a chrominance converting process for obtaining a chrominance emphasis image or a chrominance suppression image by performing chrominance conversion to an original color image is disclosed.

In short, the chrominance converting process intends to obtain R', G', and B' signals of the chrominance conversion image from R, G, and B signals of an original color image by the following equation (1).

$$\begin{pmatrix} R' \\ G' \\ B' \end{pmatrix} = \begin{pmatrix} a, & b, & c \\ d, & e, & f \\ g, & h, & i \end{pmatrix} \begin{pmatrix} R \\ G \\ B \end{pmatrix} \quad (1)$$

The technique to obtain the chrominance emphasis image by such a chrominance converting process is used in a color image processing apparatus such as color scanner, color television camera, color monitor, video recorder, color printer, or the like.

In the conventional color image processing apparatus, a chrominance converting process is executed for the entire original color image, thereby obtaining a chrominance emphasis image.

There is, however, a problem such that when the chrominance emphasizing process is executed in the case where there is a deviation of the balance of the R, G, and B signals of the original color image due to spectral characteristics of the sensor or the like, a side effect such that a color deviation becomes conspicuous in the portion of a small chrominance or luminousness occurs.

SUMMARY OF THE INVENTION

It is an object of the invention to provide color image processing method and apparatus which can suppress side effects of the chrominance emphasizing process.

According to the first aspect of the invention, there is provided a color image processing method in which at least one of the chrominance and the luminousness is detected for every pixel of a digital color image or for every coordinate of an analog color image and chrominance conversion to such a pixel or coordinate is controlled on the basis of at least one of the detected chrominance and luminousness and a resultant value is generated.

According to the second aspect of the invention, there is provided a color image processing apparatus comprising: at least one of chrominance detecting means for detecting a chrominance at every pixel of a digital color image or at every coordinate of an analog color image and luminousness detecting means for detecting a luminousness; chrominance conversion control means for deciding a chrominance conversion content for such a pixel or coordinate on the basis of at least one of the detected chrominance and luminousness; and chrominance conversion processing means for executing chrominance conversion due to the chrominance conversion content.

According to the color image processing method and apparatus of the present invention, the chrominance/luminousness is detected at every pixel of the digital color image or at every coordinate of the analog color image and the content of the chrominance converting process is changed in accordance with the chrominance or luminousness.

Therefore, by suppressing the chrominance emphasizing process in the region of a small chrominance/luminousness, the adverse side effect of conspicuous color deviation is suppressed.

BRIEF DESCRIPTION OF THE DRAWINGS

FIG. 3 is a color display diagram according to the Munsell notation system;

FIG. 4 is a block diagram of a chrominance conversion processing section;

FIG. 5 is a chromaticity diagram showing the contents of chrominance conversion;

DESCRIPTION OF THE PREFERRED EMBODIMENTS

The present invention will be described in further detail hereinbelow in accordance with embodiments shown in the diagrams. The invention is not limited by those embodiments.

The first embodiment will be first explained.

Figures 1, 2:
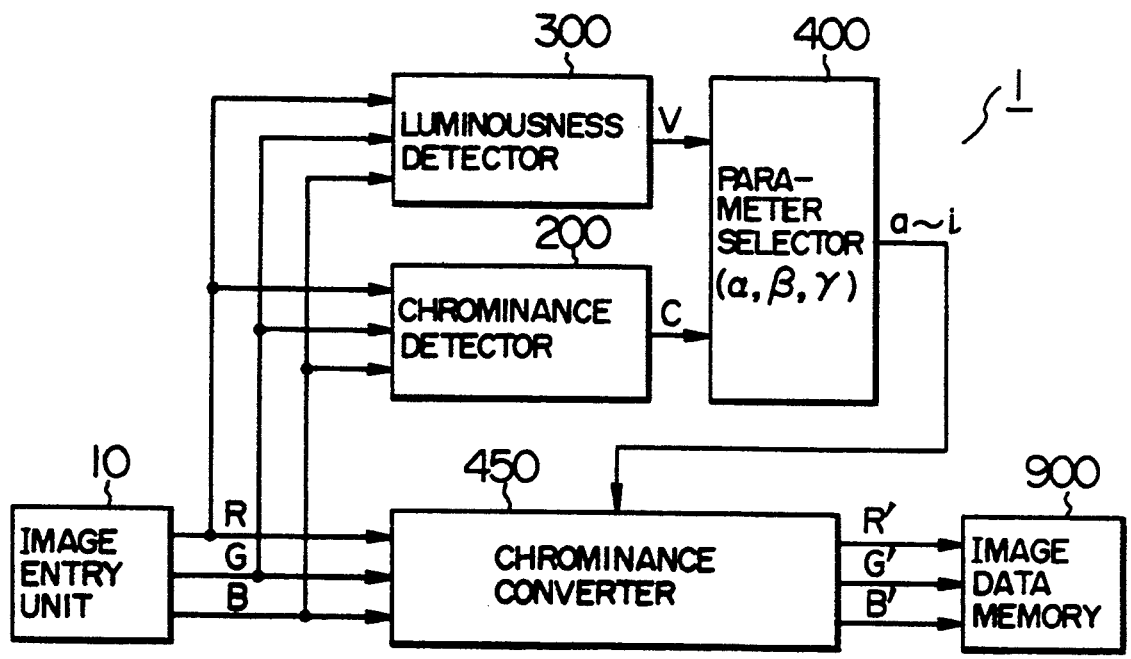
FIG. 1 is a whole constructional diagram of a color image processing apparatus according to the first embodiment of the present invention.
FIG. 2 is a diagram showing a table of parameters.

FIG. 1 is a whole constructional diagram of a color image processing apparatus 1 according to the first embodiment of the invention.

The color image processing apparatus 1 comprises: an image entry unit 10; a chrominance detector 200; a luminousness detector 300; a parameter selector 400; a chrominance converter 450; and an image data memory 900.

The image entry unit 10 generates R, G, and B signals of an original color image.

The chrominance detector 200 detects and outputs a chrominance C from the R, G, and B signals of the original color image. The chrominance detector 200 comprises shift registers and adders. As a chrominance detecting method, for instance, a well-known method based on the chrominance calculating method disclosed in Hiroshi Tanaka, "The image Processing Application Technique", The Kogyo Chosakai, is used.

The luminousness detector 300 detects and outputs a luminousness V from the R, G, and B signals of the original color image. The detector 300 comprises a combination of shift registers and adders. As a luminousness detecting method, for instance, a well-known method based on the luminousness calculating method disclosed in Hiroshi Tanaka, "The Image Processing Application Technique", The Kogyo Chosakai, is used.

The above chrominance detector 200 and luminousness detector 300 can be also easily constructed by a memory which receives substantially four upper bits when each of the R, G, and B signals of the original color image is 8-bit digital data.

The parameter selector 400 selects and outputs parameters a to i for chrominance conversion on the basis of the chrominance C, luminousness V, first threshold value $\alpha$ of the chrominance, second threshold value $\beta$ of the chrominance, and luminousness threshold value $\gamma$.

FIG. 2 shows a table of the relationships between the chrominance C, luminousness V, first chrominance threshold value $\alpha$, second chrominance threshold value $\beta$, and luminousness threshold value $\gamma$ as inputs to the parameter selector 400 and the parameters a to i for chrominance conversion as outputs from the parameter selector 400.

Region of $C \leq \beta$ and $V \leq \gamma$ (region $D_1$ in the Munsell notation system (HCV notation system) of FIG. 3)

b, e, h=1 and a, c, d, f, g, i=0; Region of $C \leq \beta$ and $V > \gamma$ (region $D_2$ in the Munsell notation system (HCV notation system) of FIG. 3)

a, e, i=1 and b, c, d, f, g, h=0; Region of $\beta < C \leq \alpha$ (Region $D_3$ in the Munsell notation system (HCV notation system) of FIG. 3)

a, e, i=1 and b, c, d, f, g, h=0; Region of $\alpha > C$ (Region $D_4$ in the Munsell notation system (HCV notation system) of FIG. 3)

a to i are set to predetermined chrominance emphasis parameters $k_1$ to $k_9$.

For instance, now assuming that Q is a proper real number larger than <1>, the values of the chrominance emphasis parameters $k_1$ to $k_9$ are as follows.

$k_1, k_5, k_9 = 1 + 2Q$ $k_2, k_3, k_4, k_6, k_7, k_8 = 1 - Q$.

The chrominance converter 450 executes a chrominance converting process by the equation (1) and generates R', G', and B' signals of the chrominance conversion image. For instance, the chrominance converter 450 comprises shift registers and adders as shown in FIG. 4.

The result of the chrominance converting process is as follows.

In the region (region $D_1$ in FIG. 3) of $C \leq \beta$ and $V \leq \gamma$, $$R' = G' = B' = G.$$

Therefore, a monochromatic image is obtained by only the G signal of the original color image.

Such a monochromatic image is adequate in a region of extremely small chrominance and luminousness.

In the region (region $D_2$ in FIG. 3) of $C \leq \beta$ and $V > \gamma$ and the region (region $D_3$ in FIG. 3) of $\beta < C \leq \alpha$, $$R' = R, G' = G, B' = B.$$

Therefore, the same image as the original color image is obtained.

That is, in the region of a small chrominance, the chrominance emphasizing process is not executed and the color deviation is inconspicuous.

In the region (region $D_4$ in FIG. 3) of $\alpha < C$, the values of R', G', and B' are calculated by the chrominance emphasis parameters $k_1$ to $k_9$, so that a clear chrominance emphasis image is obtained.

In the region of a large chrominance, even when the chrominance emphasizing process is executed, the color deviation is inconspicuous.

The image data memory 900 accumulates the R', G', B' signal data of the chrominance conversion image.

FIG. 5 is an explanatory diagram showing the contents of the chrominance conversion by a chromaticity diagram based on the x-y notation system.

In the chromaticity diagram, it is assumed that $$x = R/(R+G+B)$$

$$y = G/(R+G+B)$$

where, W denotes a white color point.

It will be understood from FIG. 5 that the chrominance increases as the distance from the white color point W increases.

Closed curves 240 and 250 show boundaries which are determined by the chrominance threshold values $\alpha$ and $\beta$ and the luminousness threshold value $\gamma$. A closed curve 260 shows color range which can be expressed by an ideal CRT.

The inside of the closed curve 240 corresponds to the region $D_1$ in FIG. 3 and a monochromatic image is expressed because an original color point $m_1$ is moved to the white color point W.

The outside of the closed curve 240 corresponds to the region $D_2$ in FIG. 3 and the inside of the closed curve 250 corresponds to the region $D_3$ in FIG. 3. The same image as the original color image is obtained in the outside of the closed curve 240 and the inside of the closed curve 250, since the original color point $m_2$ is not moved.

The outside of the closed curve 250 corresponds to the region $D_4$ in FIG. 3 and a chrominance emphasis image is expressed because an original color point $m_3$ is moved so as to be further from the white color point W.

In the above first embodiment, a monochromatic image is shown by moving the original color point $m_1$ in the region $D_1$ in FIG. 3 to the white color point W. However, it is also possible to express a chrominance suppression image by moving the original color point $m_1$ so as to approach the white color point W. Such a method can be realized by, for instance, setting a value of Q to decide the chrominance emphasis parameter to a real number smaller than <1>.

According to the above first embodiment, it is possible to prevent the color deviation from becoming conspicuous in the region of small chrominance and luminousness in the chrominance emphasis image.

The second embodiment will now be described.

Figures 6, 7:
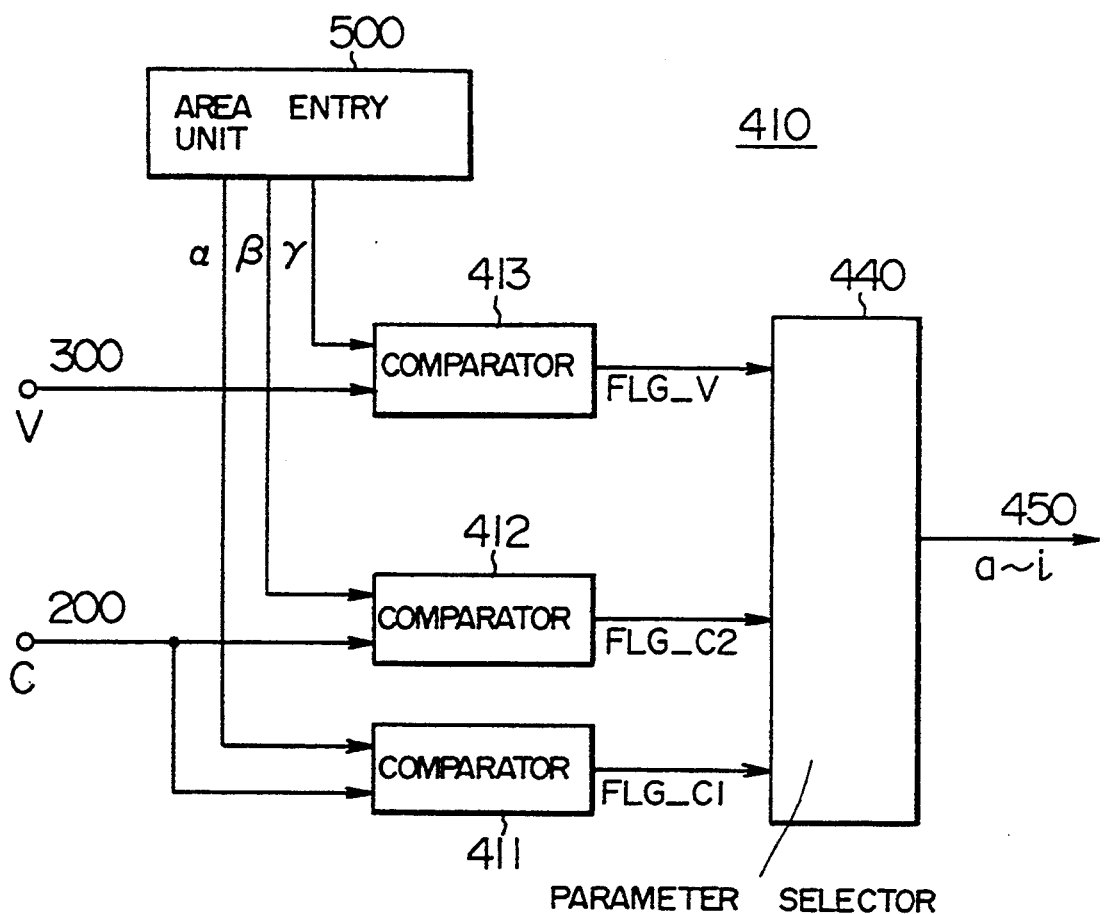
FIG. 6 is a block diagram of a parameter selector in a color image processing apparatus of the second embodiment of the invention.
FIG. 7 is a diagram showing a table of parameters.

In a color image processing apparatus of the second embodiment, the parameter selector 400 in FIG. 1 is replaced by a parameter selector 410 shown in FIG. 6.

The parameter selector 410 comprises: an area entry unit 500; comparators 411 to 413; and a parameter selector 440.

The area entry unit 500 receives commands of the chrominance threshold values $\alpha$ and $\beta$ and luminousness threshold value $\gamma$ from the user and generates the output chrominance threshold values $\alpha$ and $\beta$ and luminousness threshold value $\gamma$.

The comparator 411 compares the first chrominance threshold value $\alpha$ and the chrominance C, and generates $FLGC_1=0$ when $\alpha<C$ and also generates $FLGC_1=1$ when $\alpha\geq C$.

The comparator 412 compares the second chrominance threshold value $\beta$ and the chrominance C and generates $FLGC_2=0$ when $\beta<C$ and also generates $FLGC_2=1$ when $\beta\geq C$.

The comparator 413 compares the luminousness threshold value $\gamma$ and the luminousness V and generates $FLGV=0$ when $\gamma<V$ and also generates $FLGV=1$ when $\gamma\geq V$.

The parameter selector 440 selects and outputs parameters a to i for chrominance conversion on the basis of the chrominance C, luminousness V, first chrominance threshold value $\alpha$, second chrominance threshold value $\beta$, and luminousness threshold value $\gamma$.

FIG. 7 shows a table of the relationships between $FLGC_1$, $FLGC_2$, and FLGV as inputs to the parameter selector 440 and the parameters a to i for chrominance conversion as outputs from the parameter selector 440. The above relationship table is equivalent to the relationship table of FIG. 2.

According to the above second embodiment, in addition to the effects in the first embodiment, there is an advantage such that the user can adjust the reference to change the chrominance conversion contents while monitoring the chrominance emphasis image on the CRT or the like.

The third embodiment will now be described.

Figure 8:
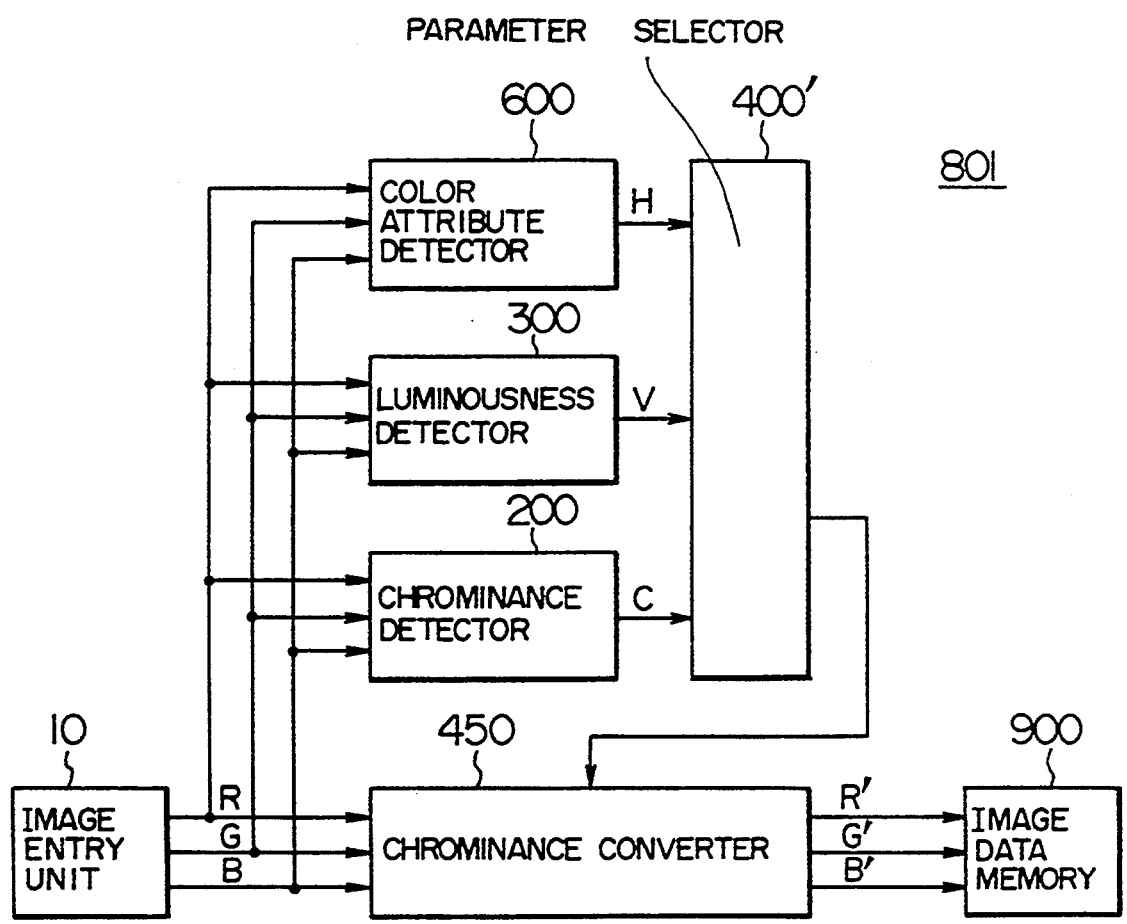
FIG. 8 is a whole constructional diagram of a color image processing apparatus according to the third embodiment of the invention.

FIG. 8 is a whole constructional diagram of a color image processing apparatus 801 according to the third embodiment of the invention.

In the color image processing apparatus 801, a color attribute detector 600 is added to the color image processing apparatus 1 of FIG. 1 and the parameter selector 400 is replaced by a parameter selector 400'.

The color attribute detector 600 detects and outputs a color attribute H from the R, G, and B signals of the original color image and comprises a combination of shift registers and adders. As a color attribute detecting method, for instance, a well-known color attribute calculating method disclosed in Hiroshi Tanaka, "The Image Processing Application Technique", The Kogyo Chosakai, is used When the color attribute H lies within a predetermined range ($H_1\leq H\leq H_2$), the parameter selector 400' changes the parameters a to i for chrominance conversion due to the chrominance C and luminousness V in a manner similar to that in the first or second embodiment mentioned above. When the color attribute H is out of the predetermined range (H <$H_1$, $H_2$<H), the parameter selector 400' generates the parameters a to i for chrominance conversion so as to execute the chrominance emphasis irrespective of the chrominance C and luminousness V.

Figure 9:
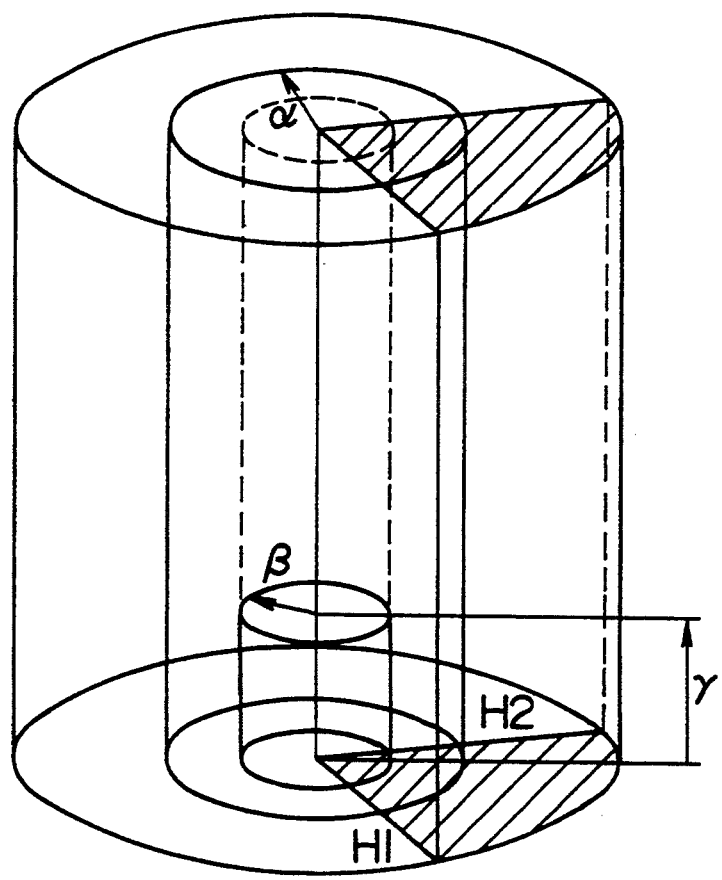
FIG. 9 is a color display diagram according to the Munsell notation system.

FIG. 9 is an explanatory diagram showing color attribute threshold values $H_1$ and $H_2$ by the Munsell notation system.

According to the above third embodiment, in addition to the effects in the first embodiment, there is an advantage such that the user can control the chrominance conversion in a desired color attribute range.

Although the first to third embodiments have been described on the assumption of a digital color image with respect to the original color image, the invention can be also similarly applied to the case of an analog color image. However, although the chrominance conversion control is executed by the digital circuit on a pixel unit basis in case of the digital color image, the chrominance conversion control is performed by an analog circuit on a coordinate unit basis in case of the analog color image.

According to the color image processing method and apparatus of the present invention, it is possible to suppress the side effect such that the color deviation becomes conspicuous in the portion of small chrominance and luminousness due to the execution of the chrominance emphasizing process.

Consequently, the image data of a high quality can be obtained.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A color image processing method, comprising the steps of:

inputting a digital color image;

detecting at least one of a chrominance and a luminousness for each pixel of said input digital color image;

outputting each pixel of said input digital color image having either of a chrominance $C\leq$ a chrominance threshold value $\beta$ and a luminousness $V\leq$ luminousness threshold value $\gamma$, based on at least one of said detected chrominance and luminousness; and emphasizing the chrominance and outputting each pixel of said input color image having said chrominance $C>$ said chrominance threshold value $\beta$ and said luminousness $V>$ said luminousness threshold value $\gamma$, based on at least one of said detected chrominance and luminousness.

2. A method according to claim 1, wherein each pixel of said input digital color image is output whose chrominance $C\leq$ said chrominance threshold value $\beta$ and whose luminousness $V>$ said luminousness threshold value $\gamma$.

3. A color image processing method, comprising the steps of:
   inputting a digital color image;
   detecting at least one of a chrominance and a luminousness and a color attribute for each pixel of the input digital color image;
   outputting each pixel of said input digital color image having either of a chrominance $C \leq$ a chrominance threshold value $\beta$ and a luminousness $V \leq$ luminousness threshold value $\gamma$, based on at least one of said detected chrominance and luminousness, wherein said color attribute satisfies a predetermined range; and
   emphasizing the chrominance and outputting each pixel of said input color image having a chrominance $C >$ said chrominance threshold value $\beta$ and said luminousness $V >$ said luminousness threshold value $\gamma$, based on at least one of said detected chrominance and luminousness.

4. A color image processing method, comprising the steps of:
   inputting an analog color image;
   detecting at least one of a chrominance and luminousness for each coordinate of said input analog color image;
   outputting each coordinate of said input digital color image having either of a chrominance $C \leq$ a chrominance threshold value $\beta$ and a luminousness $V \leq$ luminousness threshold value $\gamma$, based on at least one of said detected chrominance and luminousness; and
   emphasizing the chrominance and outputting each coordinate of said input color image having a chrominance $C >$ said chrominance threshold value $\beta$ and a luminousness $V >$ said luminousness threshold value $\gamma$, based on at least one of said detected chrominance and luminousness.

5. A color image processing method, comprising the steps of:
   inputting a digital color image;
   detecting at least one of a chrominance and a luminousness for each pixel of said input digital color image;
   suppressing the chrominance and outputting each pixel of said input digital color image having either of a chrominance $C \leq$ a chrominance threshold value $\beta$ and a luminousness $V \leq$ luminousness threshold value $\gamma$, based on at least one of said detected chrominance and luminousness;
   outputting each pixel of said input digital color image whose chrominance $C \leq \beta$ and whose luminousness $V >$ said luminousness threshold value $\gamma$;
   outputting each pixel of said input digital color image in which $\beta <$ chrominance $C \leq$ another chrominance threshold value $\alpha$; and
   emphasizing the chrominance and outputting each pixel of said input color image in which $C > \alpha$.

6. A color image processing apparatus, comprising:
   chrominance detecting means for detecting a chrominance for every pixel of a digital color image;
   luminousness detecting means for detecting a luminousness for every pixel of a digital color image;
   output means for outputting each pixel of said input digital color image having either of a chrominance $C \leq$ a chrominance threshold value $\beta$ and a luminousness $V \leq$ luminousness threshold value $\gamma$, based on at least one of said detected chrominance and luminousness; and
   emphasis means for emphasizing the chrominance and outputting each pixel of said input digital color image having said chrominance $C >$ said chrominance threshold value $\beta$ and said luminousness $V >$ said luminousness threshold value $\gamma$, based on at least one of said detected chrominance and luminousness.

7. An apparatus according to claim 6, wherein said output means further outputs the pixel whose chrominance $C \leq$ said predetermined chrominance threshold value $\beta$ or whose luminousness $V >$ said predetermined luminousness threshold value $\alpha$.

8. A color image processing apparatus, comprising:
   chrominance detecting means for detecting a chrominance for every pixel of a digital color image;
   luminousness detecting means for detecting a luminousness for every pixel of a digital color image;
   color attribute detecting means for detecting color attribute for every pixel of the digital color image;
   output means for outputting each pixel of said input digital color image having either of a chrominance $C \leq$ a chrominance threshold value $\beta$ and a luminousness $V \leq$ luminousness threshold value $\gamma$, based on at least one of said detected chrominance and luminousness; and
   emphasis means for emphasizing the chrominance and outputting each pixel of said input digital color image having said chrominance $C >$ said chrominance threshold value $\beta$ and said luminousness $V >$ said luminousness threshold value $\gamma$, based on at least one of said detected chrominance and luminousness.

9. A color image processing apparatus, comprising:
   chrominance detecting means for detecting a chrominance for every coordinate of an analog color image;
   luminousness detecting means for detecting a luminousness for every coordinate of said analog color image;
   output means for outputting each coordinate of said input analog color image having either of a chrominance $C \leq$ a chrominance threshold value $\beta$ and a luminousness $V \leq$ luminousness threshold value $\gamma$, based on at least one of said detected chrominance and luminousness; and
   emphasis means for emphasizing the chrominance and outputting each coordinate of said input analog color image having said chrominance $C >$ said chrominance threshold value and said luminousness $V >$ said luminousness threshold value based on at least one of said detected chrominance and luminousness.

10. A color image processing apparatus, comprising:
    chrominance detecting means for detecting a chrominance for every pixel of a digital color image;
    luminousness detecting means for detecting luminousness for every pixel of said digital color image;
    suppressing means for suppressing the chrominance and outputting each pixel of said input digital color image having either of a chrominance $C \leq$ a chrominance threshold value $\beta$ and a luminousness $V \leq$ luminousness threshold value $\gamma$, based on at least one of said detected chrominance and luminousness;
    outputting means for outputting each pixel of said input color image having a chrominance $c \leq \beta$ and luminousness $V > \gamma$ and for the pixel having a threshold value $\gamma <$ chrominance $C \leq$ another chrominance threshold value $\alpha$; and
    emphasis means for emphasizing the chrominance and outputting each pixel having said chrominance $C >$ said another chrominance threshold value $\alpha$.

* * * * *